(12) United States Patent
Sano et al.

(10) Patent No.: US 11,433,725 B2
(45) Date of Patent: Sep. 6, 2022

(54) BUSHING AND VEHICLE SUSPENSION DEVICE

(71) Applicants: Mazda Motor Corporation, Hiroshima (JP); MOLTEN CORPORATION, Hiroshima (JP)

(72) Inventors: Susumu Sano, Kure (JP); Takahiko Shigyo, Hiroshima (JP); Hiroki Kimura, Hiroshima (JP); Masaya Hiramatsu, Hiroshima (JP); Haruaki Iseri, Hiroshima (JP); Kazuhiro Okuyama, Hiroshima (JP); Hiroyuki Okamoto, Bath (GB); Eiji Okada, Hiroshima (JP); Naoki Kurata, Fukuyama (JP); Hiromi Miwade, Hiroshima (JP); Tadashi Yoshimura, Hiroshima (JP); Ryo Ogawa, Hatsukaichi (JP); Tomohiro Tuji, Hiroshima (JP); Masayuki Mochizuki, Hiroshima (JP)

(73) Assignees: Mazda Motor Corporation, Hiroshima (JP); MOLTEN CORPORATION, Hiroshima (JP)

( * ) Notice: Subject to any disclaimer, the term of this patent is extended or adjusted under 35 U.S.C. 154(b) by 296 days.

(21) Appl. No.: 16/592,696

(22) Filed: Oct. 3, 2019

(65) Prior Publication Data

US 2020/0108682 A1      Apr. 9, 2020

(30) Foreign Application Priority Data

Oct. 4, 2018   (JP) .............................. JP2018-189084

(51) Int. Cl.
  *B60G 7/02*   (2006.01)
  *F16F 1/38*   (2006.01)

(52) U.S. Cl.
  CPC .................. *B60G 7/02* (2013.01); *F16F 1/38* (2013.01); *B60G 2204/143* (2013.01);
  (Continued)

(58) Field of Classification Search
  CPC .......... F16F 1/393; F16F 2234/02; F16F 1/38; B60G 2204/4102; B60G 2204/4103; B60G 2204/143; B60G 7/02
  See application file for complete search history.

(56) References Cited

U.S. PATENT DOCUMENTS

| 3,030,132 A | * | 4/1962 | Bernard | .................. F16F 1/393 403/203 |
| 4,129,394 A | | 12/1978 | Eichinger et al. | |

(Continued)

FOREIGN PATENT DOCUMENTS

| CN | 102785545 A | * | 11/2012 | ............. B60G 7/001 |
| CN | 102900759 A | * | 1/2013 | ................ F16F 1/38 |

(Continued)

OTHER PUBLICATIONS

FR 2614000 A1 translation from espacenet.com Nov. 2021.*
(Continued)

*Primary Examiner* — Paul N Dickson
*Assistant Examiner* — Maxwell L Meshaka
(74) *Attorney, Agent, or Firm* — Parsons Behle & Latimer

(57) ABSTRACT

The bushing includes an outer cylinder, an inner cylinder, and an elastic body therebetween. The outer cylinder has a central recess portion recessed from the inner peripheral surface in the radial direction at the central portion in the axial direction, and the thickness of both end portions is thicker than the thickness of the central portion. The central recess portion is formed in a curved shape or having a curved and a straight shape. The inner cylinder has a central
(Continued)

convex portion swelling from the outer peripheral surface in the radial direction at a position corresponding to the central recess portion. The maximum outer diameter of the central convex portion is larger than the minimum inner diameter of the inner peripheral surface of the outer cylinder.

5 Claims, 6 Drawing Sheets

(52) U.S. Cl.
CPC ............... *B60G 2204/4103* (2013.01); *B60G 2206/124* (2013.01); *F16F 2234/02* (2013.01)

(56) References Cited

U.S. PATENT DOCUMENTS

| | | | | | |
|---|---|---|---|---|---|
| 5,887,859 | A | * | 3/1999 | Hadano | F16F 1/38 267/141.1 |
| 5,915,842 | A | | 6/1999 | Redinger | |
| 6,273,406 | B1 | * | 8/2001 | Miyamoto | B60G 3/202 267/140.12 |
| 8,282,305 | B2 | * | 10/2012 | Rechtien | F16C 11/0614 403/131 |
| 2002/0060385 | A1 | * | 5/2002 | Mayerbock | F16F 13/14 267/293 |
| 2015/0322998 | A1 | * | 11/2015 | Lee | F16F 1/393 403/133 |
| 2019/0144106 | A1 | * | 5/2019 | Riedl | F16C 27/066 384/536 |
| 2020/0108682 | A1 | * | 4/2020 | Sano | F16F 1/3842 |
| 2020/0109760 | A1 | * | 4/2020 | Sano | F16F 1/3842 |

FOREIGN PATENT DOCUMENTS

| | | | | | |
|---|---|---|---|---|---|
| CN | 104895974 | A | * | 9/2015 | ............ F16C 27/063 |
| CN | 105134850 | A | | 12/2015 | |
| CN | 106704437 | A | * | 5/2017 | ............... B60G 7/02 |
| CN | 112268088 | A | * | 1/2021 | |
| DE | 3536283 | A1 | | 10/2006 | |
| DE | 102005060490 | A1 | * | 6/2007 | ............... F16F 1/393 |
| DE | 102015215425 | B3 | * | 6/2016 | ............... B60G 7/02 |
| DE | 102015210917 | A1 | * | 12/2016 | ............... B60G 3/20 |
| DE | 102017208240 | A1 | * | 11/2018 | ............... B60G 7/02 |
| EP | 1217249 | A1 | * | 6/2002 | ............... F16F 13/16 |
| EP | 1281887 | A2 | * | 2/2003 | ............ F16F 1/3842 |
| EP | 2607739 | A2 | * | 6/2013 | ............... F16F 1/38 |
| EP | 3633228 | A1 | * | 4/2020 | ............... F16F 13/14 |
| FR | 2562967 | A1 | | 10/1985 | |
| FR | 2614000 | A1 | | 10/1988 | |
| FR | 2691767 | A1 | * | 12/1993 | ............... B60G 7/02 |
| FR | 2695972 | A1 | * | 3/1994 | ............... F16F 1/393 |
| FR | 3045501 | A1 | | 6/2017 | |
| GB | 2545721 | A | * | 6/2017 | ............... F16F 1/38 |
| JP | H03-012029 | | | 2/1991 | |
| JP | H0312029 | | | 2/1991 | |
| JP | H06106931 | A | | 4/1994 | |
| JP | 2008095861 | A | | 4/2008 | |
| JP | 2009154732 | A | * | 7/2009 | |
| WO | WO-03093039 | A1 | * | 11/2003 | ............ F16C 11/0614 |
| WO | WO-2012026778 | A2 | * | 3/2012 | ............... B60G 7/005 |
| WO | WO-2013140700 | A1 | * | 9/2013 | ............... F16F 15/08 |
| WO | WO-2014055084 | A2 | * | 4/2014 | ............... B60G 7/02 |
| WO | WO-2018079244 | A1 | * | 5/2018 | ............... F16F 1/393 |
| WO | WO-2020017242 | A1 | * | 1/2020 | ............... F16F 1/387 |

OTHER PUBLICATIONS

FR 2562967 A1 translation espacenet.com Nov. 2021.*
European Patent Office; Extended European Search Report; European Patent Application No. 19201011.4 dated Mar. 2, 2020.
Japanese Patent Office; Office Action for Japanese Patent Application No. 2018-189084 dated May 24, 2022.

* cited by examiner

Behavior with respect to the external force in the front-rear direction

Behavior with respect to the external force in the left-right direction a : Before drawing ⇒ b : After drawing a : Before drawing ⇒ b : After drawing a : Before drawing ⇒ b : Drawing process ⇒ c : Drawing process after
before forming    forming (can be omitted)

BUSHING AND VEHICLE SUSPENSION DEVICE

BACKGROUND OF THE INVENTION

The present disclosure relates to a bushing, in particular, a vibration isolating bushing, and a suspension device for a vehicle.

For example, a bushing for isolating vibration is known which is interposed in a mounting portion of various parts constituting a suspension of an automobile. The bushing has a function of vibration absorption and suspension positioning, and relatively low frequency vibration is absorbed by a large part such as a spring or a damper, whereas relatively high frequency vibration is absorbed by a small part such as a bushing.

The bushing includes an inner cylinder hollow in the axial direction and made of metal, an elastic body such as rubber fixed to the outer peripheral surface of the inner cylinder, and an outer cylinder made of metal fixed to the outer peripheral surface of the elastic body. The bushing is attached to the attachment portion by attaching one of the various parts to be vibration-proof-connected to the inner cylinder and attaching the other one of the various parts to be vibration-proof-connected to the outer cylinder. For the stopper function when inserted into the mounting hole of the other part, which is necessary at the occasion above, a technique is disclosed in which an end portion and a flange portion are provided by squeezing and molding an outer cylinder, and an elastic body (rubber) is provided around the flange portion, thereby exhibiting the stopper function (for example, refer to Patent Document 1).

However, in Patent Document 1, when a force acts in the axial direction of the inner cylinder in a state of being mounted in the mounting hole, the stopper function for the inner cylinder disappears due to deformation of the outer cylinder, and thus there is a problem in durability of the bushing. In addition, if the stopper function of the bushing cannot be sufficiently exhibited, the performance of the suspension designed to define the behavior of the wheel with respect to various external forces input to the vehicle may not be fully exhibited.

Patent document: J.H03-12029.U

SUMMARY OF THE INVENTION

The present disclosure has been made in view of the above-mentioned problems, and an object thereof is to provide a bushing having an improved self-contained stopper function of an inner cylinder and an outer cylinder. It is another object of the present disclosure to provide a front suspension device for a vehicle comprising a bushing capable of giving regularity to the behavior during running of the vehicle and having high durability. In order to achieve the above object, the present disclosure can be understood from the following configurations.

(1) In a first aspect of the present disclosure, a bushing having an outer cylinder an inner cylinder and an elastic body provided between the outer cylinder and the inner cylinder being characterized in that: the outer cylinder has a cylindrical inner peripheral surface having constant radius formed concentrically with the axis of the inner cylinder or eccentrically with respect to the axis of the inner cylinder and has a central recess portion recessed from the inner peripheral surface in a radial direction orthogonal to the direction of the axis at a central portion along the direction of the axis wherein thicknesses of both ends of the outer cylinder are thicker than a thickness of the central portion the central recess portion is formed to have a curved shape or a combination of a curved shape and a straight shape in a cross-sectional view along the direction of the axis wherein a vertex (V) of the central recess portion farthest from the axis of the inner cylinder is located on the curved shape; the inner cylinder has a central convex portion that swells from the outer peripheral surface in a radial direction orthogonal to the direction of the axis at a position corresponding to the central recess portion of the central portion in the direction of the axis and the central convex portion is formed to have a curved shape or a combination of a curved shape and a straight shape in a cross-sectional view along the direction of the axis wherein a maximum outer diameter of the central convex portion is larger than a minimum inner diameter of the inner peripheral surface of the outer cylinder (2) The bushing of (1) above, the curve of the central recess portion is formed by an arc centered on a first position radially displaced from the axis of the inner cylinder in cross-sectional view along the axis and the curve of the central convex portion is formed by an arc centered on a second position radially displaced from the axis of the inner cylinder and different from the first position in cross-sectional view along the axis.

(3) The bushing of (2) above, wherein a radius of the arc of the central convex portion is smaller than a radius of the arc of the central recess portion.

(4) The bushing according to any one of (1)-(3) above, wherein the outer cylinder has a cylindrical outer peripheral surface with a constant radius at a position corresponding to the central recess portion.

(5) The bushing according to any one of (1)-(4) above, wherein the elastic body is bonded to both the outer cylinder and the inner cylinder.

(6) In a second aspect of the present disclosure, a vehicle suspension device, having an arm member provided between a knuckle for rotatably supporting a wheel and a vehicle body for vertically displaceably positioning the wheel and two bushings for swingably supporting the arm member with respect to the vehicle body and disposed apart from each other in the vehicle front-rear direction, being characterized in that: one bushing of the two bushings includes an outer cylinder fixed to one of the vehicle body or the arm member, an inner cylinder fixed to the other of the vehicle body or the arm member, and an elastic body provided between the outer cylinder and the inner cylinder the outer cylinder has a cylindrical inner peripheral surface having a constant radius formed concentrically with the axis of the inner cylinder or eccentrically with respect to the axis of the inner cylinder and has a central recess portion recessed from the inner peripheral surface in a radial direction orthogonal to the direction of the axis at a central portion in the direction of the axis and the thickness of both ends is greater than the thickness of the central portion in the cross-sectional view along the direction of the axis the central recess portion is formed to have a curved shape or a combination of a curved shape and a straight shape, and an vertex of the inner cylinder farthest from the axis is located on the curved shape; the inner cylinder has a central convex portion which swells from the outer peripheral surface in a radial direction orthogonal to the direction of the axis at a position corresponding to the central recess portion of the central portion in the direction of the axis in a cross-sectional view along the direction of the axis the central convex portion is formed in a curved shape or a combination of a curved shape and a straight shape, and the maximum outer diameter is larger than the minimum inner diameter of the inner peripheral surface of the outer cylinder and the other bushing of the two bushings is configured to allow rotation of the arm member about the one bushing caused by an external force applied to the wheel when the vehicle is running.

Effect of the Invention: According to the present disclosure, since the central recess portion of the outer cylinder wraps the central convex portion of the inner cylinder with the elastic body interposed therebetween, the wrap structure of the outer cylinder over the inner cylinder can be realized, and the thicknesses of both end portions of the outer cylinder in the axial direction are configured to be thicker than the central portion, it is possible to provide a bushing having an improved self-contained stopper function of the inner cylinder and the outer cylinder. In addition, it is possible to provide a front suspension device having a bushing which can impart regularity to the behavior during running of the vehicle and has high durability.

DETAILED DESCRIPTION OF THE INVENTION

Figure 1:
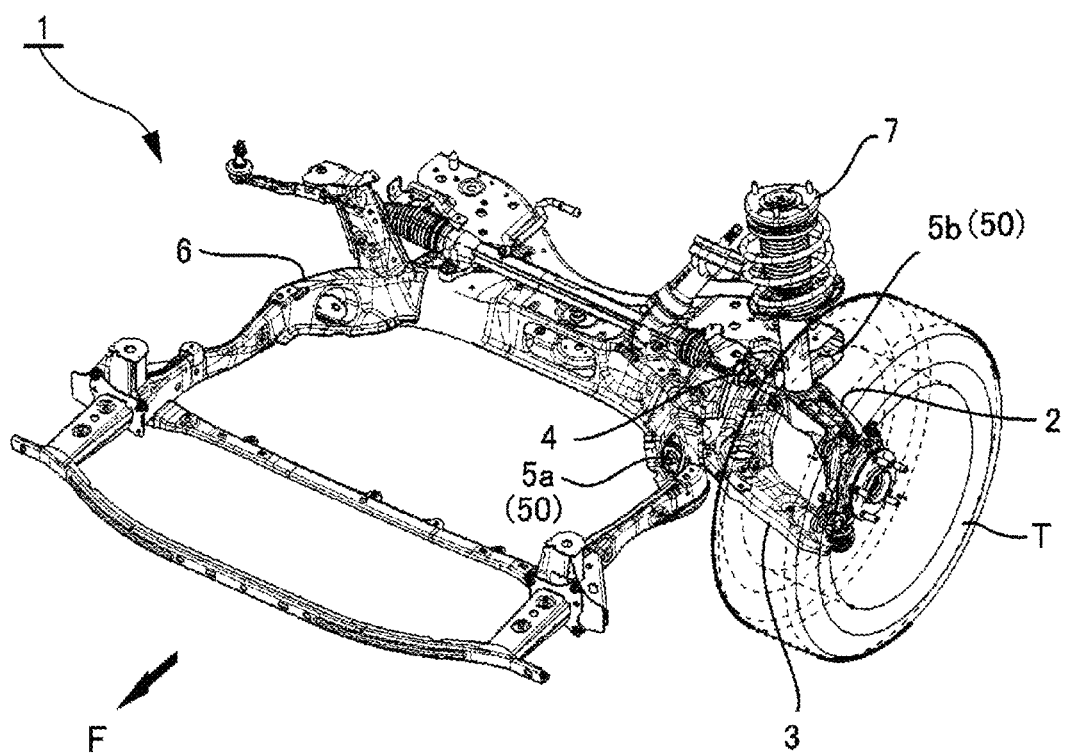
FIG. 1 is a perspective view showing a portion of a suspension of an automobile employing a bushing according to an embodiment of the present disclosure.

Throughout the description of the embodiments, the same elements are denoted by the same reference numerals.

(Suspension)

FIG. 1 shows an example of a front suspension 1 of a motor vehicle.

Here, an example in which a so-called strut type suspension is employed as the front suspension 1 is shown. In addition, the right side of the suspension system in the vehicle running direction F is partially omitted, but has a configuration that is basically symmetrical with that of the left side.

Since the strut type suspension is well known, only its outline will be described. The left front wheel T is rotatably supported by the knuckle 2. The knuckle 2 is supported on the arm 3 so as to be steerable by a tie rod 4 (steering mechanism) which is displaced by rotation of a steering wheel (not shown). The end of the arm 3 facing away from the knuckles 2 is supported on a subframe 6 by two bushings 5a and 5b which are spaced apart from each other in the longitudinal directions of the vehicle. A coil damper 7 is provided between the knuckle 2 and a vehicle body member (not shown) above the knuckle 2.

According to such a configuration, when the front wheel is displaced vertically while the vehicle is running, the swinging motion of the arm 3 about a line segment connecting the two bushings 5a and 5b causes the front wheel T to be displaced along a predetermined trajectory.

Of the two bushings 5a and 5b, the front bushing 5a includes an outer cylinder 60, an inner cylinder 70, and an elastic body 80 provided between the outer cylinder 60 and the inner cylinder 70, as described later. The arrangement direction is such that the axial direction is substantially along the front-rear direction of the vehicle. The inner cylinder 70 is fixed to the subframe 6, and the outer cylinder 60 is fixed to the arm 3.

Of the two bushings 5a and 5b, the rear side bushing 5b includes an outer cylinder 60, an inner cylinder 70, and an elastic body 80 provided therebetween, similarly to the front side bushing 5a. The arrangement direction is different from that of the front bushing 5a, and the axial direction is, for example, the vertical direction. And a hollow portion 5c is provided, which is a space formed in the elastic body 80, so as the arm 3 is configured to be horizontally displaced by the hollow portion 5c more than that by the front bushing 5a.

Figure 2A:
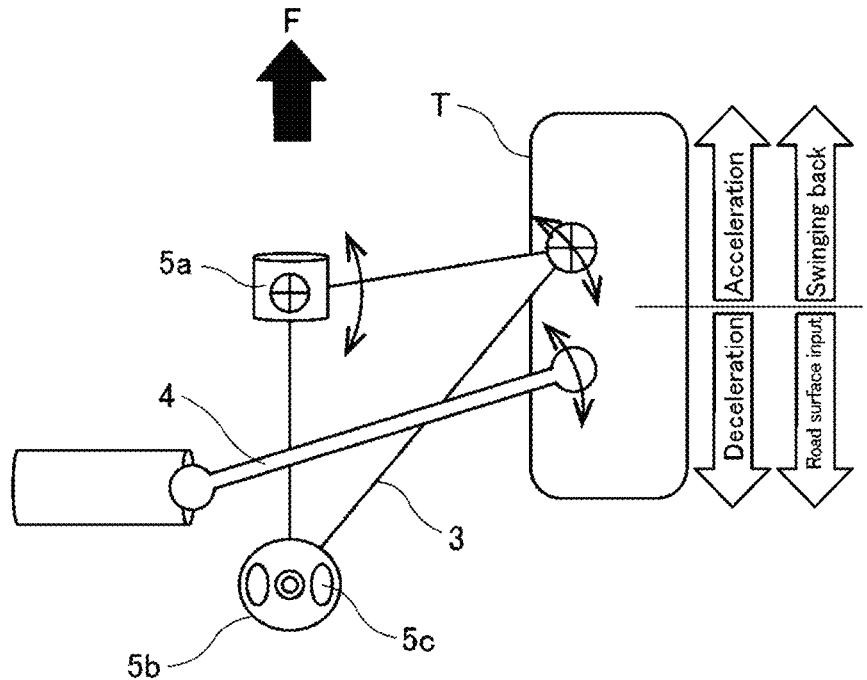
FIG. 2A is a schematic diagram of the suspension behavior during running in a suspension system employing a bushing according to an embodiment of the present disclosure, wherein shows the behavior with respect to the external force in the front-rear direction.
Figure 2B:
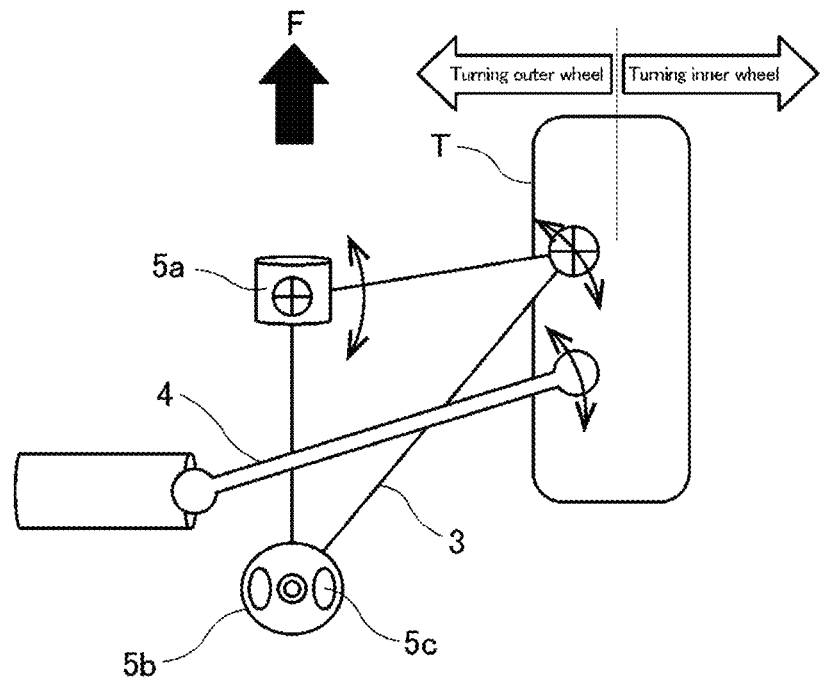
FIG. 2B is a schematic diagram of the suspension behavior during running in a suspension system employing a bushing according to an embodiment of the present disclosure, wherein shows the behavior with respect to the external force in the left-right direction.

FIGS. 2A and 2B show the positioning function of the suspension. More specifically, FIG. 2A shows the behavior with respect to the external force in the front-rear direction, and FIG. 2B shows the behavior with respect to the external force in the left-right direction. With the configuration and arrangement of the two bushings 5a and 5b as described above, the arm 3 is horizontally displaced by an external force applied to the wheels in various directions when the vehicle is running as shown in FIGS. 2A and 2B. That is, the rotational displacement about the front bushing 5a is mainly the rotational displacement. Therefore, regularity is provided to the behavior of the front suspension 1 while the vehicle is running, and the predictability of the driving for the driver can be improved. Also, due to the behavior above of the suspension device, regularity is provided to the feeling of the drivers response through the steering mechanism and the steering wheel. Therefore, a sense of security and stability can be given to the driver.

(Bushing)

The front bushing 5a positively allows the arm 3 to rotate horizontally, thereby improving the self-contained stopper function. Therefore, when the above-described behavior of the arm 3 is generated, a device for securing durability is required. Hereinafter, the two bushings 5a and 5b will be described with reference to FIGS. 3 to 5. Although the bushing 5a and 5b is collectively described below as the bushing 50, the bushing 50 is not limited to the one used for the front suspension 1 described above, and is used for a wide variety of suspensions.

Figure 3:
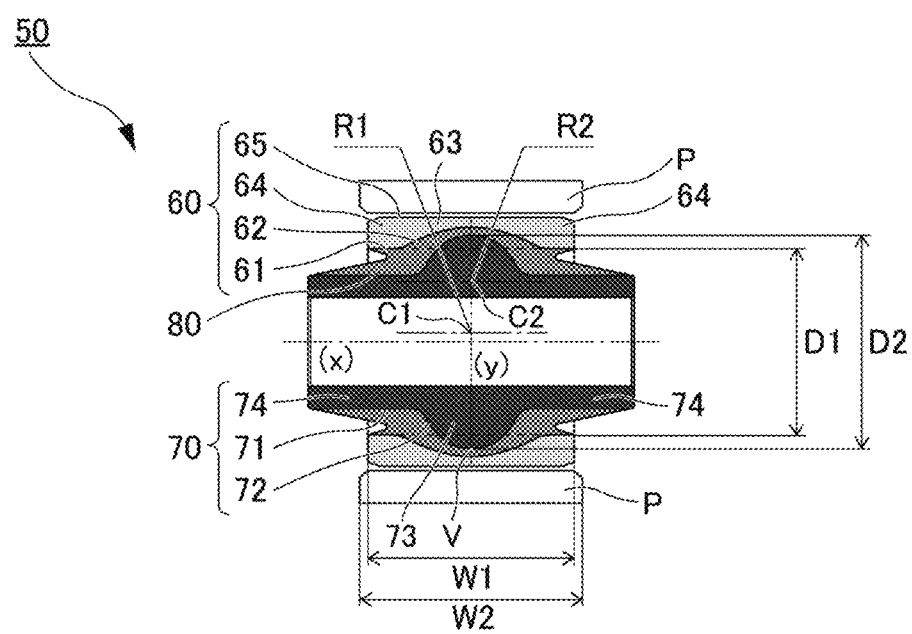
FIG. 3 is a cross-sectional view of a bushing according to an embodiment of the present disclosure taken along the (x) axis direction.

FIG. 3 shows a cross-sectional view of bushing 50. The bushing 50 includes an outer cylinder 60, an inner cylinder 70, and an elastic body 80 provided between the outer cylinder 60 and the inner cylinder 70. FIG. 3 shows an embodiment in which the (x) axial direction center of the inner cylinder 70 and the (x) axial direction center of the outer cylinder 60 are provided at the same position. However, in the application of the gist of the present embodiment, the outer cylinder 60 may be positioned so as to be offset to either one of the both ends 74 with respect to the center in the (x) axial direction of the inner cylinder 70. Among a plurality of modes, a most suitable mode may be selected in accordance with various conditions when the bushing 50 is mounted on a vehicle.

In the following description, the central portion 63 of the outer cylinder 60 means a part of area between both ends 64 of the outer cylinder 60. The central portion 73 of the inner cylinder 70 means a part of area between both ends 74 of the inner cylinder 70. Therefore, the central recess portion 62 of the outer cylinder 60 and the central convex portion 72 of the inner cylinder 70 are described as the central recess portion 62 and the central convex portion 72 respectively, including the case where the central recess portion 62 and the central convex portion 72 are positioned offset to either one of the both ends 74 with respect to the (x) axial center of the inner cylinder 70.

Figure 4:
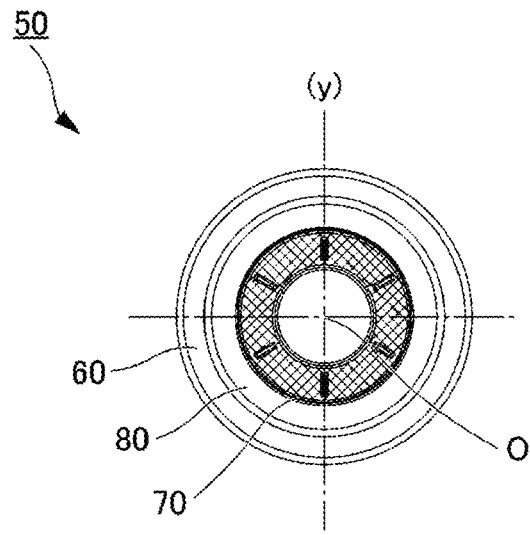
FIG. 4 is a side view of the bushing showing the case where the outer cylinder and the inner cylinder are concentric.
Figure 5:
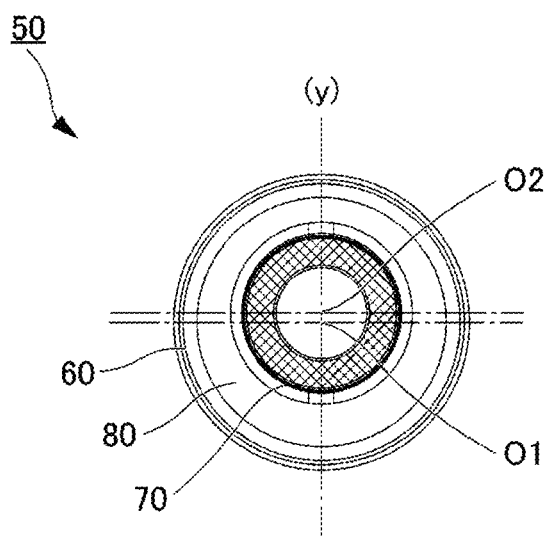
FIG. 5 is a side view of the bushing showing the case where the outer cylinder and the inner cylinder are eccentric in the (y) axis direction.

In FIG. 3, as shown in the side view of FIG. 4, the outer cylinder 60 and the inner cylinder 70 are drawn so as to be concentric (without offset) at the center O. However, as shown in the side view of FIG. 5, the outer cylinder 60 and the inner cylinder 70 may be formed to be eccentric (i.e., offset) to each other in the (y) axial direction, such as the center O1 of the outer cylinder 60 is not positioned just at the center O2 of the inner cylinder 70. Also in this respect, the selection may be made in accordance with various conditions when the bushing 50 is mounted on the automobile. The gist of the present embodiment is applied to any aspect.

Returning to FIG. 3, the bushing 50 will be described in detail. The outer cylinder 60 has a cylindrical inner peripheral surface 61 having a partially constant radius and formed concentrically with the (x) axis of the inner cylinder 70 or eccentrically with respect to the (x) axis of the inner cylinder 70. And the outer cylinder 60 has a central recess portion 62 recessed from the inner peripheral surface 61 in a radial direction (i.e., in a (y) axial direction) orthogonal to the (x) axial direction at a central portion 63 in the (x) axial direction, and the thickness of both ends 64 of the outer cylinder 60 is formed to be thicker than the thickness of the central portion 63. In the outer cylinder 60, a cylindrical outer peripheral surface 65 having a constant radius is positioned at a position corresponding to the central recess 62.

In FIG. 3, the curve of the central recess portion 62 of the outer cylinder 60 exemplifies an arc shape of a radius R1 centered on a first position C1 which deviates from the (x) axis of the inner cylinder 70 in the radial direction (i.e., in the (y) axial direction) in a cross-sectional view along the (x) axial direction. However, in the cross-sectional view along the (x) axial direction, the central recess portion 62 may be formed in a curved shape other than a circular arc shape in surface shape, or in a combination of a curved shape and a straight shape. On the curve of the central recess portion 62 of the outer cylinder 60, the vertex V of the inner cylinder 70 farthest from the (x) axis is located.

On the other hand, concerning the inner cylinder 70, a central convex portion 72 which swells (or in other words, "bulges") from the outer peripheral surface 71 in the radial direction (the (y) axial direction) orthogonal to the axial direction is provided at a position corresponding to the central recess portion 62 of the outer cylinder 60, in the central portion 73 of the (x) axial direction.

In FIG. 3, the curve of the central convex portion 72 of the inner cylinder 70 exemplifies the arc shape of the radius R2 centered on the second position C2 different from the first position C1, which is not concentric, similarly to the curve of the central recess portion 62 of the outer cylinder 60. That is, in the cross-sectional view along the (x) axis direction, the curve of the central convex portion 72 of the inner cylinder 70 protrudes in the radial direction (i.e., in the (y) axis direction) from the (x) axis of the inner cylinder 70. However, this portion may also be formed in a curved shape other than a circular arc shape or a shape in which a curve and a straight shape are combined in a cross-sectional view along the (x) axis direction, similarly to the central recess portion 62.

Here, the maximum outer diameter D2 of the central convex portion 72 of the inner cylinder 70 is formed to be larger than the minimum inner diameter D1 of the inner peripheral surface 61 of the outer cylinder 60. The maximum outer diameter D2 of the central convex portion 72 is the distance between the two points located on the curve of the central recess portion 62 of the outer cylinder 60, i.e., the two vertexes V of the central convex portion 72, which are farthest from the (x) axis of the inner cylinder 70, in the vertical direction in the drawing. The minimum inner diameter D1 of the inner peripheral surface 61 of the outer cylinder 60 is a distance between two points closest to the (x) axis of the inner cylinder 70 on the inner peripheral surface 61 except for the central recess portion 62.

From the above configuration, as shown by the broken line in FIG. 3, the bushing 50 has a mode in which the central recess portion 62 of the outer cylinder 60 surrounds the central convex portion 72 of the inner cylinder 70 with the elastic body 80 interposed therebetween, so that the wrap structure of the outer cylinder 60 and the inner cylinder 70 can be obtained.

By acquiring this wrap structure, the bushing 50 can improve the self-contained stopper function of the outer cylinder 60 with respect to the inner cylinder 70. Therefore, it is possible to eliminate the stopper as set by the conventional bushing, thereby preventing trouble such as abnormal noise or the like. Further, in the bushing of the bulge structure without the wrap structure in the conventional inventions, the function as the stopper cannot be performed, even if the characteristic can be adjusted. On the other hand, the bushing 50 has a function of improving the stopper function, enhancing the characteristics in the axial direction and the vertical-axis direction, and decreasing the characteristics in the twisting direction, which are advocated by the conventional inventions.

In the bushing 50, a central recess portion 62 is formed in the outer cylinder 60, and the thickness of both ends 64 is formed to be thicker than the thickness of the central portion 63. This difference in wall thickness increases the strength of the stopper, so that the function can be maintained even if the input load increases. In order to further enhance the stopper effect, it is desirable that the length W2 of the pressure inlet of the press-fit partner part P (e.g., the arm 3) into which the bushing 50 is press-fitted is equal to or longer than the length W1 of the outer cylinder 60 of the bushing 50 so as to enclose the entire outer cylinder 60.

Further, by providing the outer cylinder 60 with a difference in wall thickness and making the surface of the outer peripheral surface 65 straight, the inner peripheral surface 61 can be freely shaped and the degree of freedom of adjustment of the characteristics can be widened, without impairing the press-fit performance. In addition, the shape can be set to reduce the strain of the elastic body 80 set between the inner cylinder 70 and the outer cylinder 60, and the durability can be improved. For example, the curve consists of the central recess portion 62 and the central convex portion 72 (bulge) described above has an arc shape with a radius R1 and R2 centering on the first position C1 and the second position C2 respectively, which are not concentric with each other. And the radius R2 of the central convex portion 72 is made smaller than the radius R1 of the central recess portion 62. This construction is possible to improve the durability of the elastic body 80 by gradually increasing the wall thickness of the elastic body 80 to the position corresponding to the vertex V of the central convex portion 72 where the position of the thinnest of the elastic body 80.

As will be described later, the elastic body 80 is bonded to both the inner peripheral surface 61 of the outer cylinder 60 and the outer peripheral surface 71 of the inner cylinder 70. In case the stopper function is provided between the rubber provided in the flange portion of the outer cylinder and the peripheral component of the bushing as in the conventional inventions, there is a problem of generation of abnormal noise due to stick slip (vibration phenomenon called "chatter") at the time of contact, but the bushing 50 is bonded to both the inner peripheral surface 61 of the outer cylinder 60 and the outer peripheral surface 71 of the inner cylinder 70, therefore it is possible to prevent generation of stick slip by the self-contained stopper function, and thus to prevent generation of abnormal noise.

The wrap structure described above can be formed by reducing the diameter of the outer cylinder 60 by drawing. The drawing process may be performed either before or after the rubber insert molding (vulcanization molding). However, the details will be described in the next section.

(Drawing Process)

Figure 6:
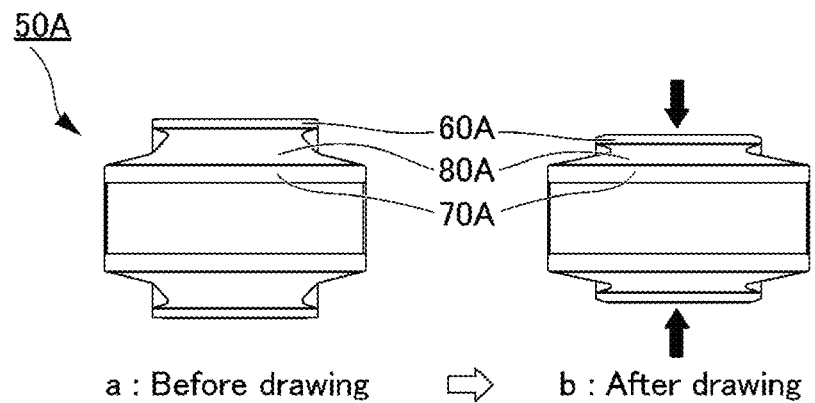
FIG. 6 is a diagram generally illustrating a flow of the drawing process for a bushing.

The drawing process for creation of the wrap structure described above will be described with reference to FIGS. 6 to 8 hereinafter. FIG. 6 is a diagram conceptually illustrating a flow of the drawing process, in which bushing 50A is not provided with a wrap structure as an example. In FIG. 6, a step (a) of the flow shows the outer cylinder 60A, the inner cylinder 70A and the elastic body 80A after the insert molding (vulcanization molding) and before the drawing process of the bushing 50A. And a step (b) in FIG. 6 shows a bushing 50A subjected to the drawing process after insert molding. The drawing process, generally, is applied to the outer cylinder 60A in the reduced diameter direction for the purpose of taking the rubber shrinkage of the elastic body 80A and/or of improving its durability.

In the present embodiment, three kinds of drawing methods are possible for giving the wrap structure to the bushing 50. The first kind of drawing method will be described with reference to FIG. 7. In the first kind of drawing method, one drawing process is performed after insert molding to form the wrap structure.

Figure 7:
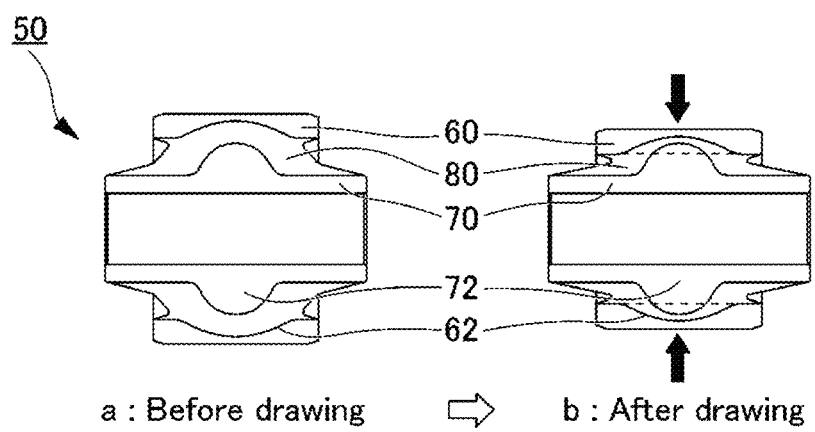
FIG. 7 is a view for explaining a flow of the first kind of drawing method of the bushing.

FIG. 7, as a step (a), shows the bushing 50 before applying drawing process thereon but after insert molding of the outer cylinder 60 and the inner cylinder 70 with the elastic body 80. And as a step (b), FIG. 7 shows the bushing 50 subjected to the drawing after insert molding. The central convex portion 72 of the inner cylinder 70 is wrapped around the central recess portion 62 of the outer cylinder 60 with the elastic body 80 interposed therebetween by the drawing process to reduce the diameter of the outer cylinder 60, thereby forming a wrap structure (see a broken line).

The outer cylinder 60 and the inner cylinder 70 is insert molded together with the elastic body 80 for obtaining the bushing 50 having a desired shape by using a mold after chemical conversion treatment and adhesive application. Then, after finishing process such as deburring or the like, obtained molded article is subjected to drawing process. The bushing 50 that has passed the inspection is packaged and shipped.

Figure 8:
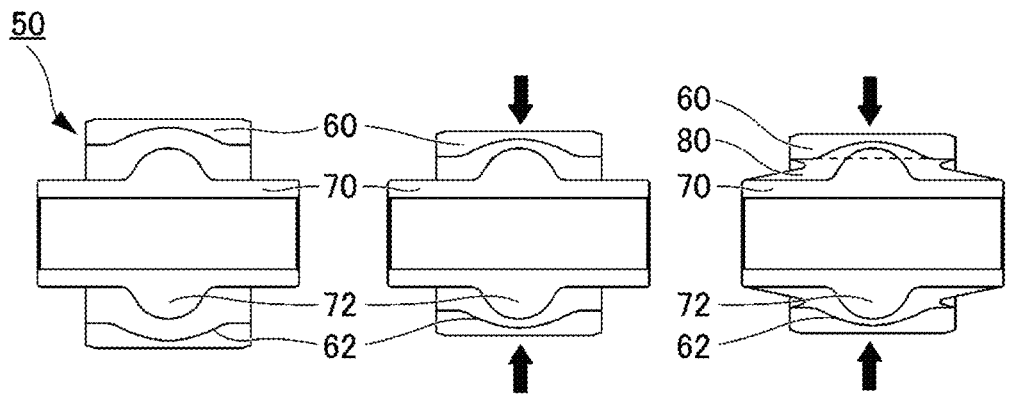
FIG. 8 is a view for explaining a flow of the second and the third kind of drawing methods of the bushing.

The second kind of drawing method will be described with reference to FIG. 8. (FIG. 8 is also used to explain the third kind of drawing method.) In the second kind of drawing method, a primary drawing process is performed before the insert molding, followed by a secondary drawing process which is performed after the insert molding to form the wrap structure.

FIG. 8, as a step (a), shows the bushing 50 before insert molding of the outer cylinder 60 and the inner cylinder 70 with the elastic body 80, wherein the drawing process is not yet performed thereon. And as a step (b), shown is the bushing 50 after the drawing prior to insert molding. And as a step (c), shown is the bushing 50 being subjected to the drawing after insert molding. The second kind of drawing method corresponds to the steps (a) to (c) shown in FIG. 8. By the drawing which is performed twice to reduce the diameter of the outer cylinder 60, a wrap structure (see a broken line) is formed in which the central convex portion 72 of the inner cylinder 70 is wrapped in the central recess portion 62 of the outer cylinder 60 with the elastic body 80 interposed therebetween, as in the case of the first kind of drawing method.

In the second kind of drawing method, the primary drawing process is performed after the chemical conversion process and the adhesive application of the outer cylinder 60 and the inner cylinder 70 are completed, but at that time the insert molding is not yet performed thereon together with the elastic body 80. Then, after the primary drawing process is performed, the outer cylinder 60, the inner cylinder 70 and the elastic body 80 are insert molded. Subsequently, a finishing process such as deburring or the like is performed on the obtained molded article. After finishing the finishing process, drawing after insert molding, that is, the secondary drawing process is performed. The bushing 50 that has passed the inspection is packaged and shipped.

In the third kind of drawing method, one drawing process for forming the wrap structure such as described above is performed prior to the insert molding. By referring to the steps (a) and (b) in FIG. 8, explanation of the third kind drawing method is omitted.

Figure 9A:
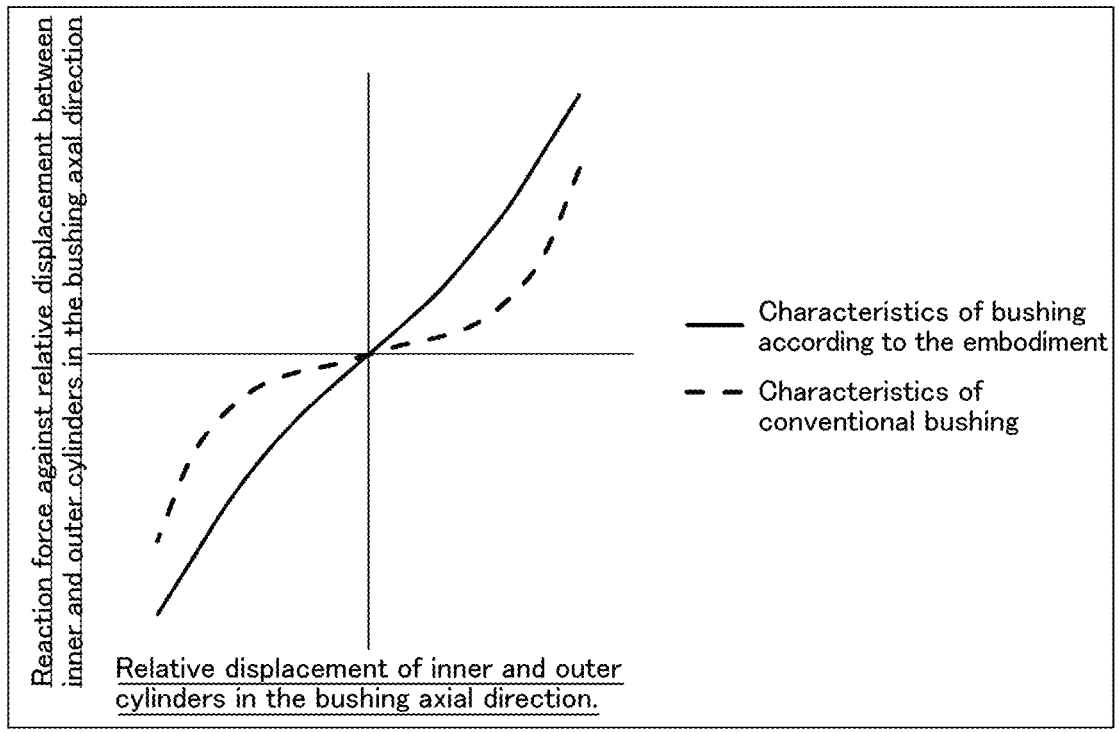
FIG. 9A is a graph showing the characteristics concerning the reaction force of the bushings.
Figure 9B:
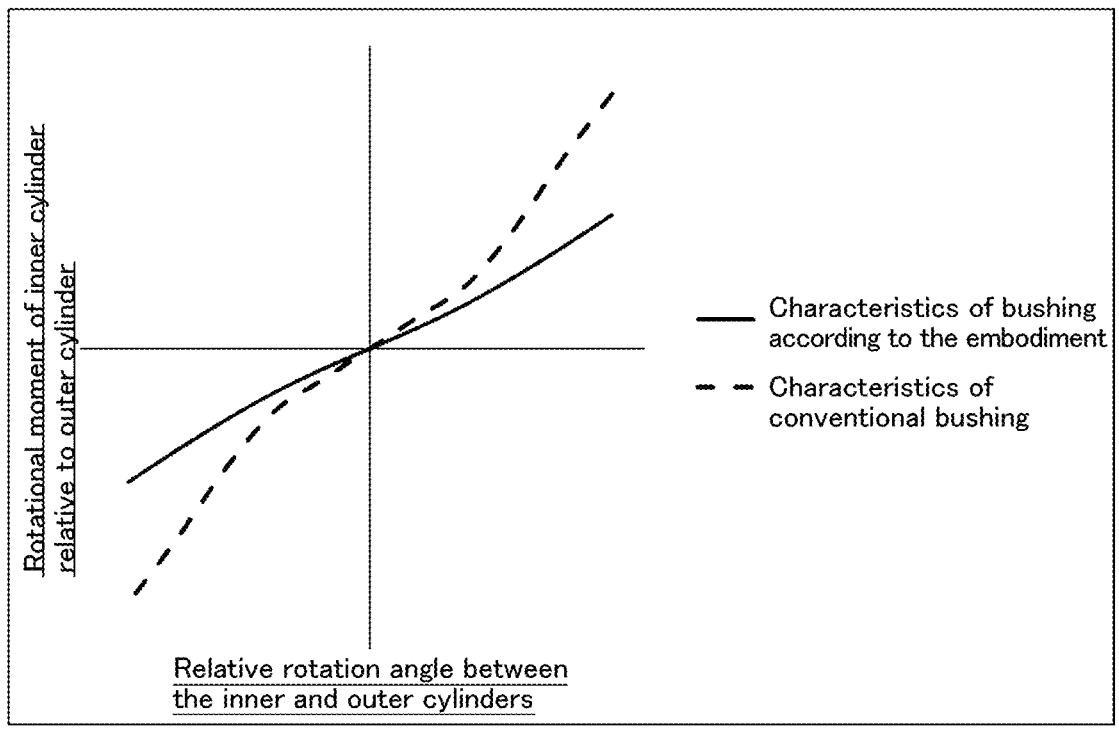
FIG. 9B is a graph showing the characteristics concerning the rotational moment of the bushings.

The characteristics of the bushing 50 configured as described above are shown in FIGS. 9A and 9B. In FIG. 9A, the horizontal axis represents the relative displacement of the inner cylinder 70 and the outer cylinder 60 in the axial direction of the bushing 50, and the vertical axis represents the reaction force with respect to the relative displacement of the inner cylinder 70 and the outer cylinder 60 in the axial direction of the bushing 50. In FIG. 9B, the vertical axis represents the moment of the inner cylinder 70 at the time of relative rotation with respect to the outer cylinder 60, and the horizontal axis represents the relative rotation angle of the inner cylinder 70 with respect to the outer cylinder 60. In the drawing, the solid line represents the characteristic of the bushing 50 according to the present embodiment, and the broken line represents the characteristics of the conventional bushing having no wrap structure.

As can be seen from FIG. 9A, in the bushing 50 according to the present embodiment, the reaction force rises from a region where the relative displacement amount in the axial direction between the inner cylinder 70 and the outer cylinder 60 is smaller than that of the conventional bushing.

And as can be seen from FIG. 9B, compared with the conventional bushing, the bushing 50 according to the present embodiment can obtain a large relative rotation angle even if the relative rotation moment of the inner cylinder 70 with respect to the outer cylinder 60 is small.

The above means the following. First, when the vehicle including the front suspension 1 shown in FIG. 1 runs, in case an external force is applied from the wheel in the axial direction (vehicle front-rear direction) of the bushing 50, the relative displacement of the bushing 50 in the axial direction, and the displacement of the arm 3 in the front-rear direction, is unlikely to occur (self-contained function is high). Second, the relative rotation of the bushing 50 and the rotation behavior of the arm 3 in the horizontal plane are likely to occur. That is, not only the external force in the vehicle width direction but also the external force in the vehicle front-rear direction tend to cause the rotation behavior of the arm 3, and regularity (behavior mainly based on the rotation behavior) is provided to the behavior of the front suspension 1 during the vehicle running, thereby improving the predictability of the driving for the driver.

Although the present disclosure has been described specifically using embodiments above, it is noted that the technical scope of the present disclosure is not limited to the scope described in the above embodiments. And it will be apparent to those skilled in the art that various modifications or improvements can be made to the above-described embodiments. In addition, it is also apparent from the scope of the claims that the embodiments added with such alterations or improvements can be included in the technical scope of the invention.

DESCRIPTION OF THE REFERENCES

1 . . . Front suspension
2 . . . Knuckle
3 . . . Arm
4 . . . Tie-rod
5a . . . Front bushing
5b . . . rear bushing
5c . . . Hollow portion
6 . . . Subframe
7 . . . Coil damper
50 . . . Bushing
60 . . . Outer cylinder
61 . . . Inner peripheral surface (of outer cylinder)
62 . . . Central recess portion (of outer cylinder)
63 . . . Central portion (of outer cylinder)
64 . . . Both ends (of outer cylinder)
65 . . . Outer peripheral surface (of outer cylinder)
70 . . . Inner cylinder
71 . . . Outer peripheral surface (of inner cylinder)
72 . . . Central convex portion (of inner cylinder)
73 . . . Central portion (of inner cylinder)
74 . . . Both ends (of inner cylinder)
80 . . . Elastic body

What is claimed is:

1. A bushing comprising:
an outer cylinder,
an inner cylinder and
an elastic body provided between the outer cylinder and the inner cylinder,
wherein the outer cylinder has a cylindrical inner peripheral surface having a constant radius formed concentrically or eccentrically with respect to an axis of the inner cylinder, and has a central recess portion recessed from the inner peripheral surface in a radial direction orthogonal to the direction of the axis of the inner cylinder at a central portion along the direction of the axis, wherein thicknesses of both ends of the outer cylinder are thicker than a thickness of the central portion;
the central recess portion is formed to have a curved shape or a combination of a curved shape and a straight shape in a cross-sectional view along the direction of the axis, wherein a vertex of the central recess portion farthest from the axis of the inner cylinder is located on the curved shape, wherein the curved shape of the central recess portion is formed by an arc centered on a first position radially displaced from the axis of the inner cylinder in the cross-sectional view along the direction of the axis;
the inner cylinder has a central convex portion that swells from an outer peripheral surface thereof in the radial direction orthogonal to the direction of the axis at a position corresponding to the central recess portion at the central portion in the direction of the axis; and
the central convex portion is formed to have a curved shape or a combination of a curved shape and a straight shape in the cross-sectional view along the direction of the axis, wherein a maximum outer diameter of the central convex portion is larger than a minimum inner diameter of the inner peripheral surface of the outer cylinder, wherein the curved shape of the central convex portion is formed by an arc centered on a second position radially displaced from the axis of the inner cylinder and different from the first position in the cross-sectional view along the direction of the axis, a radius of the arc of the central convex portion is smaller than a radius of the arc of the central recess portion, and the first position and the second position are radially displaced to a side of the arcs with respect to the axis of the inner cylinder.

2. The bushing of claim 1, wherein the outer cylinder has a cylindrical outer peripheral surface with a constant radius at a position corresponding to the central recess portion.

3. The bushing of claim 1, wherein the elastic body is bonded to both the outer cylinder and the inner cylinder.

4. The bushing of claim 2, wherein the elastic body is bonded to both the outer cylinder and the inner cylinder.

5. A vehicle suspension device, comprising:
an arm member provided between a knuckle for rotatably supporting a wheel and a vehicle body for vertically displaceably positioning the wheel, and
two bushings for swingably supporting the arm member with respect to the vehicle body and disposed apart from each other in a vehicle front-rear direction,
wherein one bushing of the two bushings includes an outer cylinder fixed to one of the vehicle body or the arm member, an inner cylinder fixed to the other of the vehicle body or the arm member, and an elastic body provided between the outer cylinder and the inner cylinder;
the outer cylinder has a cylindrical inner peripheral surface having a constant radius formed concentrically or eccentrically with respect to an axis of the inner cylinder and has a central recess portion recessed from the inner peripheral surface in a radial direction orthogonal to the direction of the axis of the inner cylinder at a central portion in the direction of the axis, and a thickness of both ends is greater than a thickness of the central portion;
in a cross-sectional view along the direction of the axis, the central recess portion is formed to have a curved shape or a combination of a curved shape and a straight shape, and a vertex of the central recess portion farthest from the axis is located on the curved shape;

the inner cylinder has a central convex portion which swells from an outer peripheral surface thereof in the radial direction orthogonal to the direction of the axis at a position corresponding to the central recess portion at the central portion in the direction of the axis;

in the cross-sectional view along the direction of the axis, the central convex portion is formed in a curved shape or a combination of a curved shape and a straight shape, and a maximum outer diameter of the central convex portion is larger than a minimum inner diameter of the inner peripheral surface of the outer cylinder;

in the cross-sectional view along the direction of the axis, the curved shape of the central recess portion is formed by an arc centered on a first position radially displaced from the axis of the inner cylinder, and the curved shape of the central convex portion is formed by an arc centered on a second position radially displaced from the axis of the inner cylinder and different from the first position;

a radius of the arc of the central convex portion is smaller than a radius of the arc of the central recess portion;

the first position and the second position are radially displaced to a side of the arcs with respect to the axis of the inner cylinder; and the other bushing of the two bushings is configured to allow rotation of the arm member about the one bushing caused by an external force applied to the wheel when the vehicle is running.

\* \* \* \* \*